United States Patent [19]

Kamperman et al.

[11] Patent Number: 4,624,790
[45] Date of Patent: Nov. 25, 1986

[54] REDUCTION OF METAL CONTENT OF TREATED EFFLUENTS

[75] Inventors: David R. Kamperman, Harmony; Leslie E. Lancy, Ellwood City; Claire A. Swank, Butler, all of Pa.

[73] Assignee: Lancy International, Inc., Zelienople, Pa.

[21] Appl. No.: 322,998

[22] Filed: Nov. 19, 1981

[51] Int. Cl.$^4$ .............................................. C02F 1/64
[52] U.S. Cl. ................................... 210/665; 210/714; 210/724; 210/912
[58] Field of Search ............... 210/684, 714, 726, 912, 210/914, 724, 665, 694

[56] References Cited

U.S. PATENT DOCUMENTS 3,740,331  6/1973  Anderson et al. .................. 210/726
4,362,629 12/1982  Senda et al. ......................... 210/714

FOREIGN PATENT DOCUMENTS 51-10176  1/1976  Japan .................................... 210/912

OTHER PUBLICATIONS

Kim, "Treatment of Metal Containing Wastewater by Sulfide Precipitation," Presented at AICHE 73rd Annual Meeting, Chicago, Ill., Nov. 16-20, 1980.

Primary Examiner—Thomas Wyse
Attorney, Agent, or Firm—Parmelee, Miller, Welsh & Kratz

[57] ABSTRACT

The residual metal content of tightly chelated heavy metal-containing effluents is reduced by carrying out a sulfide precipitation process in the presence of a seed material comprising an added unchelated soluble heavy metal salt, preferably with an adjustment of pH to at least above about 9.0, with optional variations including passage through a mixed filter media comprising at least two particulate ingredients and regeneration of the used filter media.

10 Claims, 1 Drawing Figure

REDUCTION OF METAL CONTENT OF TREATED EFFLUENTS

BACKGROUND OF THE INVENTION

Metal finishing effluents, generated in the application of cleaning, oxide and scale removal, electroplating, etching, metal stripping, etc., are problem materials in that they are toxic to aquatic life, to the biota employed in sewage treatment plants, contaminate ground water, etc. For these reasons, regulatory requirements strictly limit the residual metal content of treated effluents. In general, the waste treatment efforts directed toward this end are based upon chemical precipitation inasmuch as most metals have only a limited solubility at elevated pH when converted to the hydroxides, carbonates or oxides of the particular metal of concern. It is well known that because of an unusually variable and complex ionic background, the long time needed to approach equilibrium conditions, the presence of organic complexing agents in most of the waste streams, etc., a number of waste treatment plants cannot achieve the low levels of metal residuals stipulated by the regulatory requirements. Research work is and has long been conducted to solve this problem all over the world and technical literature is replete with numerous recommendations for its solution.

In general, four approaches for the reduction of the residual metal content of metal finishing effluents can be distinguished.

In one, removal by adsorption, various silica and alumina clays in both natural and purified forms have been employed as a means for the final treatment of metal-containing effluents. It has also been found that some organics such as cellulosic materials, peat moss, bacterial colonies in sewage treatment plants, etc., are capable of similar adsorption effects.

In a second approach, ion exchange resins have been used exchanging ions such as hydrogen or sodium for heavy metal ions that are held more tightly within the resin's molecular structure. Some of the natural clay minerals have the required molecular configuration and, under the name of natural zeolites or green sand, have been the forerunners of the polymerized organic resins commonly used today.

A third approach is based on the observation that many of the metal finishing process solutions contain metals in an organic molecular complex, e.g., as a chelate. Such non-ionic soluble metal complexes do not adsorb on the media usually employed. Peat moss has been sulfonated and, in another development, starch xanthate to release into the solution a sufficient volume of soluble sulfide compounds to react with the metal complex and allow the generation of a metal-sulfide that is adsorbable on the peat moss or starch or xanthated cellulose.

A fourth approach is based on the known fact that the solubility of the metal-sulfide compounds is significantly lower than the residual solubility of the same metal as a hydroxide, carbonate, or their combination with hydrated oxides gained from a conventional or high pH "neutralization" reaction. Precipitation with sulfide chemicals has therefore been studied as a means to reduce the soluble residuals of the ionized metal compounds and to render insoluble some of the metals held in the organic chelate complexes. A recent report from such a study supported by the U.S. Environmental Protection Agency reports the results of various commonly practiced neutralization approaches when combined with the addition of sulfide chemicals; "Sulfide Precipitation of Heavy Metals"; A. K. Robinson and J. C. Sum; U.S. EPA-NITS EPA-600/2-80-139. Hence, precipitation with sulfide chemicals has been employed to reduce the soluble residuals of the ionized metal compounds and to render insoluble some of the metals held in the organic chelate complexes.

The "Sulfex Process", U.S. Pat. No. 3,740,331, is based on the addition of a slightly soluble metal-sulfide compound, to limit the soluble sulfide concentration in a waste stream. This is accomplished by either adding the slightly soluble metal sulfide or by adding the soluble alkali-metal sulfide and the metal salt separately and reacting the added metal salt with the sulfide simultaneously with the primarily desired reaction with the metals dissolved in the effluent. The metal preferentially employed as the sulfide source is either a ferrous or manganese salt and it is to be in excess of the total reacting sulfide present to overwhelm the toxic metals present and remove them by coprecipitation.

However, experience has shown that none of the suggested methods adequately serve the purposes of industry.

With respect to the first and second approaches, it has been found that the adsorption ion exchange media investigated could not remove the metals under investigation from even the more labile inorganic complexes such as ammonium.

With respect to the third approach, sulfonated peat moss, xanthated starch or cellulose, etc., performed erratically when attempting metal removal from some of the tight metal chelates such as EDTA. Another serious shortcoming of such processes is that with the use of a bulky adsorption medium, the volume of the generated sludge has been increased manyfold.

With respect to the fourth approach, it has been recognized that the nature of the metal complex makes a very significant difference. While good results are obtained for certain ionized metal salts or metals in a more labile inorganic or organic complex, such as ammonia, acetate, gluconate, or NTA, the metals in an EDTA chelate are hardly affected. The cited EPA study did not recognize this distinction and provided no explanation for the apparent variability of their test results. Another problem with this approach is that the precipitated metal sulfides form a very fine precipitate, most often colloidal in nature, requiring the subsequent addition of a coagulant to clarify the suspended solids content or filtration. Furthermore, when sulfide additions are made to a waste stream, the sulfide has to be added in excess to the stoichiometric requirements, to provide the necessary driving force for as complete a precipitation reaction as can be achieved. This can easily leave an excessive concentration of free sulfide in an effluent stream which would be objectionable for a direct discharge.

It has therefore been our research effort to find the optimum physical and chemical conditions for sulfide precipitation and to eliminate the unpredictable variations in the chemical reaction and to develop a process suitable for the separation of metals from the solution, even when held in a tight chelate such as that with EDTA.

SUMMARY OF THE INVENTION

The process of the present invention, while applicable to rinse waters that have not been treated, preferably starts with an effluent that has been well treated and separated from the major portion of the precipitated solids by conventional means. In so doing, this approach eliminates the likelihood of excessive sulfide chemical consumption and sulfide sludge generation. In those cases where subsequent settling or flotations might be desirable, only a limited amount of coagulant, such as iron or aluminum salts, would be needed and in this way the sludge volume would be increased by a small percentage only.

In accordance with the present invention, an improved and efficient process is provided for the reduction of metal content in untreated or in previously treated heavy metal-containing effluents. The effluents, preferably previously neutralized and clarified, are reacted in a secondary treatment step with a soluble sulfide or polysulfide compound at a pH of at least 9.0 and in the further presence of an unchelated soluble heavy metal content, following which the effluent from which the soluble metals have been removed by sulfide precipitation is passed through a mixed filter media containing at least two particulate ingredients and a filter aid.

The present invention also contemplates the optional integration of a further step of filter media regeneration in which the filter, after use, is treated with an acid solution, the media washed with water and reapplied to the filter as a precoat.

DETAILED DESCRIPTION OF THE INVENTION

Figure 1:
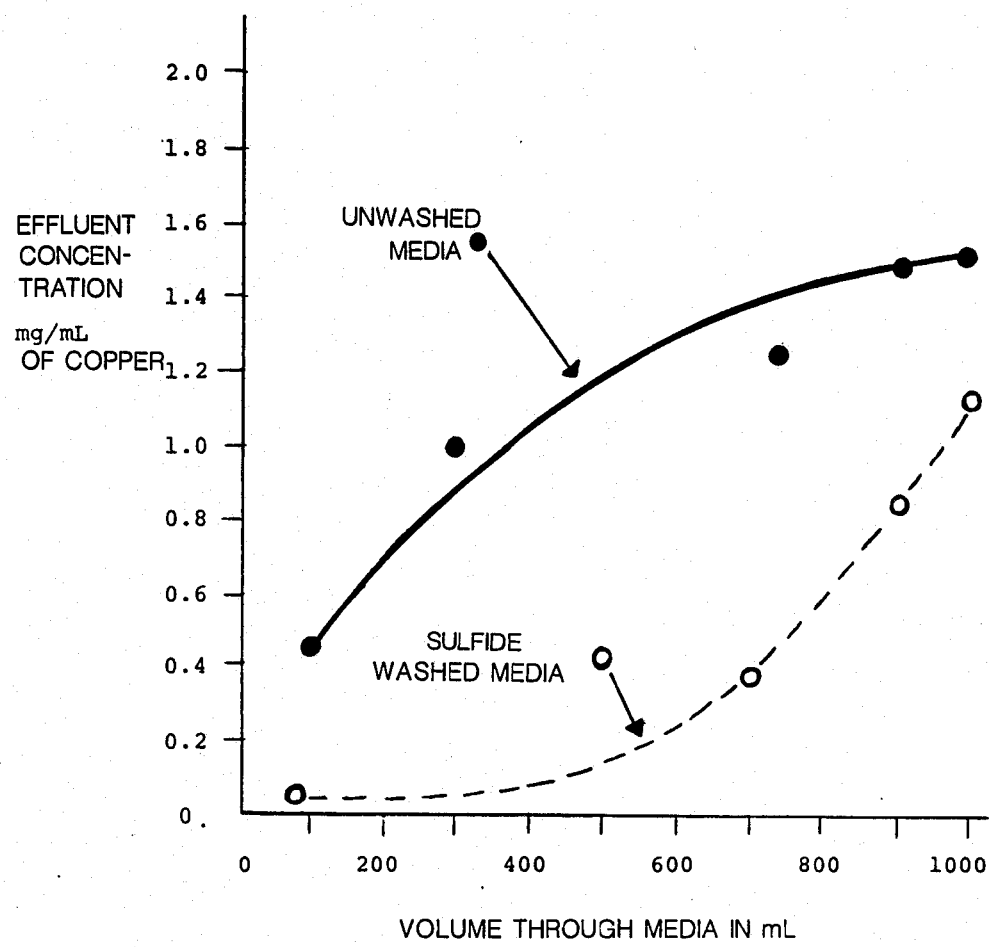

Our investigations have determined that significant improvement in the reduction of metal content in heavy metal containing effluents is achieved if, in addition to the chelated metals, the effluent also contains unchelated soluble metals. It appears that the initial sulfide precipitation thus obtained acts as a seed, accelerating the precipitation reaction. In effecting this acceleration of the sulfide precipitation, it has been found that it is not necessary to employ an unchelated metal addition similar to the chelated metals in the effluent to be treated. Any heavy metal salt which will react with the sulfide is satisfactory. In overcoming the erratic results due to the tightly complexed metal chelates present in some treated effluents, an unchelated metal concentration of from about 1 to about 6 mg/l should be maintained in the effluent in order to provide rapid seeding and an accelerated rate of sulfide precipitation. Any increase of the unchelated metal content beyond this range will result in an unnecessary and undesirable increase in sludge volume and will consume sulfide without any further significant beneficial effects.

We have further found that raising the pH level to at least 9.0 and preferably to about 9 to about 11.5 will facilitate metal removal. Increasing the pH level above 11.5, while effective, leads to no further improvement in the degree of metal removal and only results in the unnecessary consumption of chemicals.

The steps of maintaining a sufficient unchelated metal content and of adjusting the pH to at least 9.0 can be practiced separately and will result in a reduced metal content in the effluent being treated. However, in the preferred practice of the present invention, a combination of these steps will be employed.

For those experienced in the art, it will be evident that this secondary process system as described above for metal finishing effluents, particularly where previously treated by primary neutralization and clarification, provides the basis for simple finishing steps which could be either by subsequent addition of a coagulant of an iron or aluminum salt to aid the removal of the colloidal or fine particle precipitates and a subsequent secondary clarification or flotation. Filtration by itself can also retain the suspended, precipitated metal particulates using a conventional filtration technique.

In the course of our investigations, it became evident to us that the process could be further improved by the development of a filtration system with a mixed-media of particulates, one of which may act as a sulfide donor to further reduce the soluble heavy metal residuals. We found that a significant reduction of the soluble heavy metal residuals could be achieved by passing the effluent through a filter surface that was precoated with either powdered or granulated activated carbon. Improvements of like nature have been achieved with various other carbon particulates, such as char, coal dust, graphite, etc. The advantage of using activated carbon lies mainly in the fact that it is a manufactured product of uniform and predictable quality and the process of purification by activation greatly enhances the active surface area.

A diatomaceous earth filter aid is used principally to increase the porosity of the filtration surface and allow extended filtration cycles. The material that is retained, such as metal hydroxides, is known for its gelatinous nature, and the fine particulates of the precipitated heavy metal sulfides, some of which are near colloidal in nature, may easily plug a filter surface.

The inclusion of fibrous filter aid materials in the precoat mixture has been also found beneficial. Such filter aid materials as asbestos or cellulosics have been suitable. These additions chiefly aid in the physical separation in the filtration process.

It was also found desirable to include granulated clays. Natural zeolites, for example, appear to help maintain the filter surface porosity and, additionally, may provide an additional safety, due to their excellent adsorption capability for ionized heavy metals and precipitated hydroxides. The adsorption capability of the various clay adsorbents has been amply documented in the literature.

Various of these granulated materials such as the clays, activated alumina, fly ash, etc., have been investigated as additional ingredients in the mixed-media filter and could be used. The zeolites are particularly noted because they seem to have the greatest capacity by weight of adsorbent used versus heavy metals adsorbed.

In a further modification, we have found that certain of these materials, such as activated carbon, are good adsorbents for the sulfide ions and are therefore susceptible of use as a sulfide source. It is also possible that the adsorbed sulfide may so change the adsorption characteristics of the activated carbon as to make it an active surface for heavy metal removal.

Finally, in an optional variation of the overall process, a filter regeneration procedure can be integrated into the effluent treatment process. Filtration, as it is well known, progresses from a minimal back pressure condition to a gradually increasing back pressure due to the buildup of the removed solids. After a certain back pressure is reached, the filter has to be backwashed and a new precoat applied before the filter can be returned to service. It has been our assumption that with an inert filter media, such as the recommended carbon materials, granulated clays, diatomaceous earth, cellulose, etc., an acid wash will redissolve the precipitated and trapped metal residuals, allowing the reusage of the media without any loss in adsorptive quality. To test this assumption, we have collected the exhausted filter aid mass and treated it with a 20% by volume hydrochloric acid for about ½ hour to redissolve the adsorbed metal salts. Afterwards, we washed the regenerated filter aid to free it of the acid and metal residuals and found that the regenerated filter aid will perform again in all respects as well as the new material. Mineral acids such as sulfuric-, nitric-, phosphoric-, etc., also the organic acids such as acetic, citric, could be used for this purpose. Mineral acids are less expensive, can be reused more often in view of their greater capacity of holding metals in solution, and finally, the discharge of the treated acid is environmentally less objectionable, therefore should be preferable.

The following representative examples are for illustration only and are not to be construed as limitative of the present invention.

EXAMPLE 1

(a) A solution was prepared which contained 2 mg/l each of Cu, Pb, Cd and Zn, all in the form of an EDTA chelate. An excess of sodium sulfide was added as a precipitant and the solution held while slowly stirring for 20 minutes. A sample was then taken which, after filtration through an 0.45μ membrane filter, showed the following residual dissolved metal concentrations expressed in mg/l;

| Cu | Pb | Cd | Zn | S= | |
|---|---|---|---|---|---|
| 0.57 | 1.4 | 0.57 | 0.69 | 8.1 | pH = 9.5 |

Adding increasing quantities up to a few mg/l of the unchelated soluble metals (called "seed" in this test) present in the sample to a solution prepared as in (a), the results show significant improvement in the total filterable metal residual (mg/l).

| Seed | Cu | Pb | Cd | Zn | S= | pH |
|---|---|---|---|---|---|---|
| 0 | 1.90 | 0.05 | .06 | 1.26 | 3 | 9.0 |
| 1.5 | 0.10 | 0.10 | .02 | 0.12 | 6 | 9.0 |
| 3 | 0.03 | 0.05 | <.01 | 0.67 | 4 | 9.0 |
| 6 | 0.05 | <0.01 | <.01 | 0.43 | 4 | 9.0 |
| 9 | 0.06 | <0.01 | <.01 | 0.61 | 4 | 9.0 |

The seed material consists of equal amounts of Cu, Pb, Cd, Zn added as a solution of the nitrate salts. For example, the 6 ppm seed concentration was added as 1.5 ppm each of Cu, Pb, Cd, and Zn in the form of Cu(NO$_3$)$_2$, Pb(NO$_3$)$_2$, Cd(NO$_3$)$_2$ and Zn(NO$_3$)$_2$. At a pH of 9 the unchelated metals will be converted to the hydroxides and when sodium sulfide is added the metal hydroxides will be converted to the corresponding sulfides which act as "seed."

EXAMPLE 2

(a) For this example, a solution of the same composition as used in 1(a) was reacted with a sulfide in the same manner as described in the experiments conducted in Example 1.

With only pH adjustment using sodium hydroxide and/or calcium hydroxide, the soluble metal residual after membrane filtration of the metals was found to be lower for most metals but higher for Cd. The analytical results were as follows:

| Cu | Pb | Cd | Zn | |
|---|---|---|---|---|
| 0.1 | 1.0 | 1.0 | 0.03 | pH = 11.3 |

(b) Making the sulfide additions as in 1(a), the results were:

| Cu | Pb | Cd | Zn | S= | |
|---|---|---|---|---|---|
| 0.01 | 0.01 | 0.01 | 0.04 | 6.0 | pH = 11.3 |

(c) Combining the knowledge gained from the experience established with the "seed" addition, as discussed in Investigation Series #1, with the above findings, unchelated mixed metal additions were made to the sample as in 1(a) shortly before the sulfide addition.

| Seed | Cu | Pb | Cd | Zn | S= | pH | Metal added |
|---|---|---|---|---|---|---|---|
| | | | (d) | | | | |
| 3 | 0.06 | 0.10 | 0.01 | 0.49 | 4 | 9.5 | |
| | | | (e) | | | | |
| 8 | 0.02 | 0.2 | 0.02 | 0.11 | 4.5 | 10.5 | |
| | | | (f) | | | | |
| 8 | 0.03 | 0.9 | 0.02 | 0.3 | 2 | 10.1 | Ni |
| 6 | 0.01 | 0.1 | 0.01 | 0.36 | 9.6 | 10.4 | Fe |

Example 2(f) demonstrates that for the acceleration of the sulfide precipitation it is not necessary to use an unchelated metal addition similar to the chelated metals in the solution to be treated but that the addition of any heavy metals which will react with the sulfide is satisfactory.

The foregoing results of Examples 1 and 2 clearly indicate that to overcome the erratic results due to the tightly complexed metal chelates present in some of the metal finishing effluents, sulfide precipitation, if intended to be practiced after a standard neutralization and clarification process sequence, should either contain sufficient unchelated sulfide reacting metals to provide rapid seeding and therefore an accelerated rate of reaction; or the pH of the reacting solution should be raised above the standard pH 8-9 range; or one may combine the beneficial effects of raising the pH while maintaining an unchelated reacting metal concentration in the range of 1-6 mg/l.

It has been found that increasing the metal concentration above these levels, if added from an external source, unnecessarily increases the sludge volume that is generated and the sulfide consumption without any significant beneficial effects. Increasing the pH above 11.3-11.5 showed no additional improvement and can only lead to an unnecessary wastage of chemicals. The optimum pH conditions were found to be in the range of 9.0-11.5, depending on the concentration of unchelated reacting metals present or added for best sulfide precipitation reaction conditions.

For those experienced in the art, it will be evident that this secondary process system as described above for metal finishing effluents previously treated by primary neutralization and clarification, provides the basis for simple finishing steps which could be either by subsequent addition of a coagulant of an iron or aluminum salt to aid the removal of the colloidal or fine particle precipitates and a subsequent secondary clarification or flotation. Filtration by itself can also retain the suspended, precipitated metal particulates using a conventional filtration technique.

The following examples demonstrate that the process can be further improved by the development of a filtration system with a mixed-media of particulates, one of which may act as a sulfide donor to further reduce the soluble heavy metal residuals.

EXAMPLE 3

Using the sulfide precipitation process as described in Examples 1 and 2 on a solution made up as given in Example 1(a), we have conducted the following experiments and obtained the results below. The reported concentrations are all in mg/l. R.T. denotes the concentrations found after the sulfide precipitation reaction and filtration through an 0.45$\mu$ membrane filter. $M_1$ denotes the results after filtration through a mixed filter media containing powdered activated carbon and $M_2$ is a mixed filter media containing granulated activated carbon.

The carbon is also most effective in removing or at least greatly reducing the residual excess $S^=$ that has been added in the reaction tank, so that the effluent discharged is not deleterious from this standpoint. The tabulation of the results shows the $S^=$ in the influent (Inf.) and effluent (Eff.) before and after the filter.

For these experiments a fiberglass filter of 15.9 cm$^2$ was used that was previously precoated with a filter media.

For $M_1$, 8 g diatomaceous earth (Celite 535, supplied by Johns Manville), 2 g powdered activated carbon (Norit S.G. Extra) manufactured by American Norit Company.

For $M_2$, 7 g diatomaceous earth (Celite 535), 2 g granulated activated carbon (P.A.C. Type Cal, manufactured by Pittsburgh Activated Carbon), 1 g granular natural zeolite (Anaconda 1010A, supplied by Anaconda Copper Company).

The samples were taken after approximately 20 l of the synthetic, treated effluent passed through the filter.

| Cu | | | Pb | | | Cd | | |
|---|---|---|---|---|---|---|---|---|
| R.T. | $M_1$ | $M_2$ | R.T. | $M_1$ | $M_2$ | R.T. | $M_1$ | $M_2$ |
| 0.11 | <0.01 | <0.01 | 0.4 | 0.2 | 0.2 | 0.18 | 0.05 | 0.07 |

| Zn | | | $S^=$ | |
|---|---|---|---|---|
| R.T. | $M_1$ | $M_2$ | Inf. | Eff. |
| 0.08 | 0.02 | 0.03 | 3 | <0.1 |

From the foregoing results it will be evident that a significant reduction of the soluble heavy metal residuals was achieved by passing the effluent through a filter surface that was precoated with either powdered or granulated activated carbon. Those skilled in the art will recognize that a similar improvement would be achieved with various carbon particulates, such as char, coal dust, graphite, etc. The advantage of using activated carbon is chiefly in the fact that it is a manufactured product of uniform and predictable quality and the process of purification by activation greatly enhances the active surface area.

The diatomaceous earth filter aid is used to increase the porosity of the filtration surface and allow extended filtration cycles. The material that is retained, such as metal hydroxides, is known for its gelatinous nature, and the fine particulates of the precipitated heavy metal sulfides, some of which are near colloidal in nature, may easily plug a filter surface.

The inclusion of fibrous filter aid materials in the precoat mixture has been also found beneficial. Such filter aid materials as asbestos or cellulosics have been suitable. These additions principally aid in the physical separation in the filtration process.

The inclusion of granulated clays is also advantageous. Natural zeolites, as an example, as used in our experiments, appear to help maintain the filter surface porosity and, additionally, may provide an additional safety due to their excellent adsorption capability for ionized heavy metals and precipitated hydroxides. Various of these granulated materials such as the clays, activated alumina, fly ash, etc., have been investigated as additional ingredients in the mixed-media filter and could be used for such purpose.

EXAMPLE 4

To establish that the mixed filter media can retain the sulfide in a sufficiently active form to allow adsorption on the media on the heavy metal chelated by EDTA, a solution of 2 mg/l copper EDTA was prepared, the pH of which was adjusted to 11.3. Fresh media made up with 7 g Celite 535 diatomaceous earth, 2 g Norit S.G. Extra activated powdered carbon, and 1 g Anaconda 1010A natural zeolite was contacted with 1 liter of this solution, fractions of which after passing through the media were collected and analyzed. A second sample of media, made up in exactly the same manner was washed with a sodium sulfide solution containing 4 mg/l $S^=$, rinsed with water, and then contacted in a similar fashion as above with 1 liter of the same copper EDTA solution, subsequently sampled and analyzed in an identical fashion. The results of this test are graphically illustrated in FIG. 1 of the drawing.

This experiment clearly indicates that while the fresh media does have some adsorption effect on the copper EDTA, for practical purposes, the adsorption capacity is very low. The sulfide washed media on the other hand had a good adsorption effect evidenced by the reduction of the soluble copper residuals to a level near to what the mixed media filter, described above, could have achieved after the solution was previously reacted with sulfide and only then passed through the filter.

EXAMPLE 5

A second example was carried out to further illustrate this development. A solution was made up as given in Example 3, the pH adjusted to 11.3, and then reacted with the sulfide precipitant. It was then passed through a 100-mesh stainless steel filter disc of 15.9 cm$^2$ area, precoated with 7 g Celite 535 (diatomaceous earth), 2 g Norit S.G. Extra (powdered activated carbon) and 1 g Anaconda 1010A-$E_1$ (natural zeolite, medium mesh).

After 50 l of this solution was passed through the filter and adsorbent media, the $S^=$ additions were stopped to find out if improved adsorption capabilities have been incorporated into the filter media during usage.

| Vol. through Filter | Cu | Pb | Cd | Zn | Inf. S= | Eff. S= |
|---|---|---|---|---|---|---|
| 10 l | 0.03 | 0.6 | 0.08 | 0.04 | 3.2 | 0.3 |
| 20 l | 0.02 | 0.3 | 0.05 | 0.04 | 2.4 | 0.3 |
| 30 l | <0.01 | <0.2 | 0.01 | 0.03 | 7 | <0.1 |
| 40 l | <0.01 | 0.3 | 0.01 | 0.05 | 7 | 0.4 |
| 50 l | 0.02 | 0.2 | 0.01 | 0.07 | 7 | 0.2 |
| 52½ l | 0.03 | 0.7 | 0.28 | 0.08 | — | <0.1 |
| 53 l | 0.12 | 0.7 | 0.20 | 0.08 | — | |
| 53½ l | 0.27 | 0.7 | 0.23 | 0.10 | — | |
| 54 l | 0.39 | 0.9 | 0.43 | 0.10 | — | |

For practical applications, the retention of the enhanced adsorption effect of the mixed filter media will be self evident. It allows a variability of the soluble metal concentration in the effluent without the need to overfeed the sulfide addition in the reaction tank, with no significant increase in the metal concentration in the effluent. The system may also cope successfully for a short while in the event that the sulfide feed has been interrupted.

In order to demonstrate the regeneration of the mixed media and the subsequent effective use of the regenerated media, the procedure of Example 6 was carried out.

EXAMPLE 6

(a) One hundred liters of a solution containing 2 ppm each of copper, lead, cadmium and zinc, all present as the EDTA chelate, were passed through 10 grams of mixed media, not previously used. This media consisted of 6 grams of diatomaceous earth, Celite 535, manufactured by Johns Manville; 1 gram of cellulose fiber, Fibercell, manufactured by Johns Manville; 2 grams of powdered activated carbon, Norit SG extra; and 1 gram of natural zeolite, Anaconda 1010A.

The results obtained were as follows:

| | New Media - ppm | | | |
|---|---|---|---|---|
| | 1 L | 10 L | 50 L | 100 L |
| Cu | <.01 | <.01 | .02 | .12 |
| Zn | <.01 | .03 | .02 | .08 |
| Cd | .02 | .01 | .04 | .09 |
| Pb | .11 | .09 | .15 | .22 |

(b) After the above use, the mixed media was regenerated with 20% by volume hydrochloric acid for approximately one-half hour to redissolve the absorbed metal salts. The thus-treated filter is then washed to remove the acid and metal residuals.

The regenerated filter is then employed in the treatment of a solution of the same composition as treated in part (a) with the following results:

| | Regenerated Media - ppm | | | |
|---|---|---|---|---|
| | 1 L | 10 L | 50 L | 100 L |
| Cu | <.01 | .05 | .03 | .20 |
| Zn | .02 | .05 | .05 | .10 |
| Cd | .01 | .03 | .08 | .08 |
| Pb | <.01 | .02 | .04 | .15 |

EXAMPLE 7

A combined rinse water sample from the following processes: (a) electroless copper plating solution, (b) solder brightening solution, and (c) and (d) successive cleaning solution, was prepared by adding 0.5 ml of each process solution to 1,000 ml of water. The resulting solution had a pH of 3.4 and a soluble copper concentration of 1.9 ppm. The pH of this solution was raised to 11.5 with a mixture of 5 g/liter calcium hydroxide, 20 g/liter sodium hydroxide. Sodium sulfide was then added and an excess of 4 ppm maintained for 15–20 minutes. The solution was then passed through a mixed media, the same as that described on page 13. After passing through the media, the solution was found to contain 0.02 ppm total copper. An identically prepared rinse solution, treated with the same calcium hydroxide-sodium hydroxide mixture, but without sulfide addition, and not passed through the mixed media, showed a soluble copper concentration of 1.8 ppm.

This demonstrates the application of this invention directly to process rinse waters which have not received any prior treatment. This illustrates the application of this invention would be to a segregation of all process rinse waters which contain chelated metals, and the treatment of these rinse waters in accordance with the present invention. The advantages realized are the elimination of expensive conventional-type waste treatment equipment, such as recirculation pumps, chemical addition stations and clarifiers. Rinses, after being treated in accordance with this invention, can be combined with the rest of the plant effluent.

What we claim is:

1. An improved waste treatment process that has a broad range of effectiveness from the standpoint that it is effective irrespective of the nature of and variations in the dissolved metal content in a waste solution effluent that has a tightly chelated dissolved metal content therein which comprises, first providing the effluent with a pH of at least 9.0 and with a soluble sulfide or polysulfide compound therein, then providing at least 1 mg/l of an unchelated soluble heavy metal salt in the effluent and reacting it with the sulfide compound to preliminarily provide a seed and then effect an accelerated sulfide reaction with the dissolved heavy metal content of the effluent, and effectively converting the then soluble heavy metal content without preference into insoluble heavy metal sulfide.

2. A process as defined in claim 1 wherein the reaction is effected at a pH of about 9.0 to 11.5.

3. A waste treatment process as defined in claim 2 wherein the heavy metal salt is first reacted with the soluble sulfide compound, and sufficient sulfide or polysulfide compound is provided in the effluent to assure a conversion of the dissolved heavy metal content without preference as to its source.

4. A process as defined in claim 2 wherein the unchelated heavy metal salt is added to the effluent simultaneously with an addition of the soluble sulfide or polysulfide compound.

5. A process as defined in claim 2 wherein the heavy metal of the salt is the same or a different heavy metal than the heavy soluble metal or metals of the effluent.

6. A process as defined in claim 2 wherein the unchelated metal salt concentration is maintained at about 1 to 6 mg/l and is reacted with the sulfide or polysulfide compound in the effluent in such a manner as to thereafter effect a rapid seeding and an accelerated rate of heavy metal sulfide precipitation from the effluent.

7. A process as defined in claim 2 wherein, following the defined reacting steps, the resulting effluent is then passed through a filtration medium containing activated carbon particulates capable of retaining soluble sulfide compounds.

8. A process as defined in claim 1 wherein substantially all the earlier chemically treated and precipitated heavy metal hydroxides, carbonates, etc. are removed by settling, flotation, or filtration before the process as defined in claim 11 is applied, to thereby minimize the sulfide chemical consumption in the process.

9. A process as defined in claim 1 wherein the effluent resulting from the defined process and containing a soluble sulfide or polysulfide compound is passed through a filter system having a filter media coating thereon comprised of particulate and fibrous materials, one of which is a carbon material, and further reacting any remaining soluble heavy metal content in the effluent with the sulfide compound during its filtration.

10. The process according to claim 1 wherein the thus-treated effluent is thereafter passed through a filtering medium capable of retaining a reactive sulfide chemical compound, after the filtering medium has been subjected to usage and the filter appears clogged, regenerating it by backwashing and leaching out the adsorbed metal content therefrom with an acid solution, thereafter washing the media with water and then reusing it by recoating the filter with regenerated media.

* * * * *